United States Patent [19]
Miura et al.

[11] Patent Number: 5,906,839
[45] Date of Patent: May 25, 1999

[54] DIE FOR MOLDING HONEYCOMB STRUCTURE

[75] Inventors: Yasunao Miura, Nagoya; Masakazu Murata, Oobu, both of Japan

[73] Assignee: Nippondenso Co., Ltd., Kariya, Japan

[21] Appl. No.: 08/724,550

[22] Filed: Sep. 30, 1996

[30] Foreign Application Priority Data

Sep. 28, 1995 [JP] Japan ................................. 7-276916

[51] Int. Cl.⁶ .................................................. B29C 47/12
[52] U.S. Cl. ..................... 425/380; 264/177.12; 425/381; 425/461; 425/465; 425/466; 425/467
[58] Field of Search ..................... 425/380, 461, 425/464, 466, 467, 381, 465; 264/177.11, 177.12

[56] References Cited

U.S. PATENT DOCUMENTS

| | | |
|---|---|---|
| 4,298,328 | 11/1981 | Frost . |
| 4,349,329 | 9/1982 | Naito et al. ............................ 425/461 |
| 4,381,912 | 5/1983 | Yamamoto et al. .................... 425/461 |
| 4,915,612 | 4/1990 | Gangeme et al. ....................... 425/464 |
| 5,089,203 | 2/1992 | Kragle ................................. 264/177.11 |
| 5,219,509 | 6/1993 | Cocchetto et al. ................... 264/177.12 |
| 5,256,054 | 10/1993 | Cocchetto et al. . |
| 5,466,415 | 11/1995 | Brundage et al. ....................... 419/67 |
| 5,574,957 | 11/1996 | Barnard et al. ......................... 419/67 |

FOREIGN PATENT DOCUMENTS

| | | |
|---|---|---|
| 56-104008 | 8/1981 | Japan . |
| 57-006722 | 1/1982 | Japan . |
| 57-157706 | 9/1982 | Japan . |
| 4-305077 | 10/1992 | Japan . |
| 4-344217 | 11/1992 | Japan . |

*Primary Examiner*—Patrick Ryan
*Assistant Examiner*—Joseph Leyson
*Attorney, Agent, or Firm*—Pillsbury Madison & Sutro LLP

[57] ABSTRACT

The present invention provides a die for molding a honeycomb structure, which can be molded without causing bending on a cell grid and which can readily cope with changes of shrinkage percentage of the product. The invention also provides a honeycomb structure, which has no bending on the cell grid and has high strength. The die according to the present invention includes a metal die 1, having a feed hole forming unit 14 provided with feed holes 15 and a slot forming unit 11 provided with slots 12, and a guide ring 2, which has an abutment surface 25 placed face-to-face to a part of the metal die 1 via a clearance sector 22. The slot forming unit includes an outer peripheral slot forming unit 130 and a main-body slot forming unit 160, and there is provided a protruded surface 17 protruded in extruding direction between a main body end surface 16 and an outer peripheral end surface 13. The shortest linear distance "d" between the protruded surface 17 and the guide ring 2 is greater than the clearance distance "c" of the clearance sector.

7 Claims, 17 Drawing Sheets

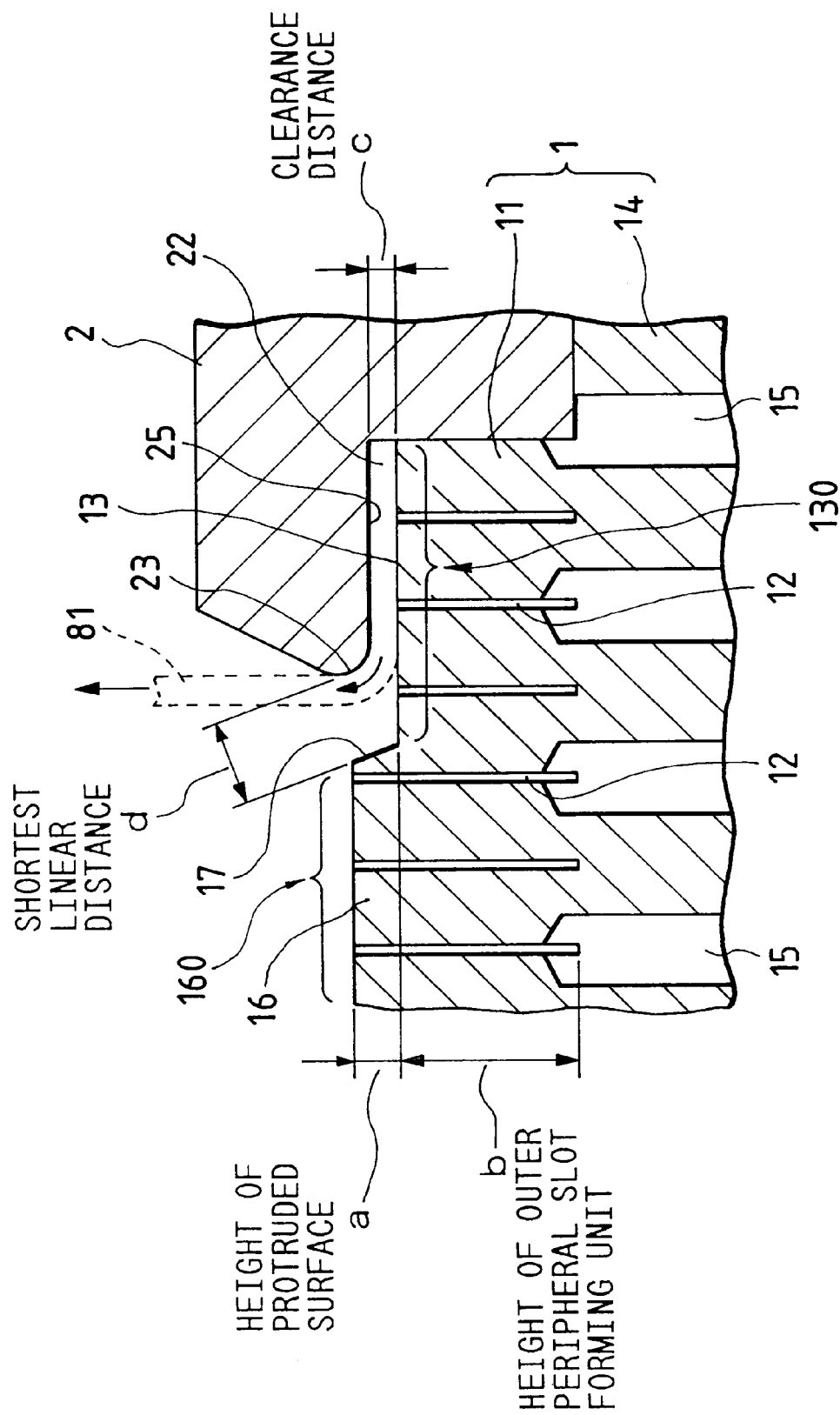

DIE FOR MOLDING HONEYCOMB STRUCTURE

BACKGROUND OF THE INVENTION

1. Field of the Invention

The present invention relates to a molding die for molding a honeycomb structure and also to the honeycomb structure.

2. Description of the Related Art

As is well known, a catalytic converter can be used for purifying exhaust gas emitted from an automobile engine. A honeycomb structure 8 used for catalyst support for such a catalytic converter in automobile comprises, for example, a cell grid 81 to form the honeycomb structure and a skin layer 82 to enclose the outer periphery of the honeycomb structure as shown in FIG. 30. Such a honeycomb structure 8 is produced by an extrusion molding method. Conventional type molding dies used for the above extrusion molding included a die 90, which comprises a metal die 91 for extruding molding material and a guide ring 92 for defining the outer diameter of the honeycomb structure as shown in FIG. 29.

As shown in FIG. 29, the metal die 91 integrally comprises a feed hole forming unit 14 having feed passageways or feed holes 15 for feeding molding material and a slot forming unit 11 where slots 12 communicating with the feed holes 15 are provided. On the other hand, the guide ring 92 has an abutment surface 25 where the material extruded from outer peripheral slot forming unit 130 of outer peripheral portion of the slot forming unit 11 is abutted, and the abutment surface 25 is placed face-to-face to an outer peripheral end surface 13 of the outer peripheral slot forming unit 130 of the metal die 91 with a clearance sector 22 therebetween.

When the honeycomb structure is extruded and molded in this molding die 90, the molding material introduced from the feed holes 15 is extruded in the form of a grid through the slots and a cell grid 81 is formed, and the molding material extruded from the outer peripheral slot forming unit of the slot forming unit 11 is brought into contact with the abutment surface 25 of the guide ring 92. The molding material thus abutted is formed to the skin layer 82 at the clearance sector 22 and is extruded in radially inward direction. Further, it is deflected toward axial direction of the honeycomb structure along an inner guide sector 23 of the guide ring 92, thereby forming the skin layer 82.

Therefore, when the honeycomb structure 8 is formed using this conventional type molding die 90, it is possible to determine the outer diameter of the honeycomb structure 8 depending on the position of the inner guide sector 23 of the guide ring 92. Specifically, by changing the position in radial direction of the inner guide sector 23 of the guide ring 92, the outer diameter of the honeycomb structure can be freely adjusted. Also, the thickness of the skin layer 82 can be determined by clearance distance of the clearance sector 22.

However, there are the following problems in the above conventional type molding die 90 for the honeycomb structure. When the skin layer 82 of the honeycomb structure is designed thick, bending may occur on the inner cell grid 81 when the molding material for forming the skin layer 82 is deflected toward axial direction of the honeycomb structure from the clearance sector 22 along the inner guide sector 23.

A detailed description will now be provided for such a case. In the molding die 90 as described above, the molding material for forming the skin layer 82, which is extruded in radially inward direction of the honeycomb structure 8 is deflected by extrusion force of the molding material, which forms the cell grid 81 extruded through the slots 12. In case the skin layer 82 is thick, component force in radial direction applied on the cell grid from the skin layer 82 becomes too high, and the cell grid 81 is bent inwardly. If bending occurs on the cell grid, compressive breaking strength of the completed honeycomb structure decreases.

Accordingly, the conventional type molding die 90 can be effectively utilized when the skin layer 82 is relatively thin compared with the thickness of the cell grid 81, but it is difficult to suit the molding of the honeycomb structure if the thickness of the skin layer 82 is relatively thick compared with the thickness of the cell grid 81. For example, to meet the requirements of the lightweight type honeycomb structure as produced in recent years, it is necessary to reduce the weight by extensively reducing the thickness of the cell grid and to increase overall strength by increasing the thickness of the skin layer, and it is difficult to use the conventional type molding die 90 for such purpose.

In contrast to this, a molding die for the purpose of preventing the bending of the cell grid is described in each of Japanese Patent Publications Laid-Open 57-157706 and 4-305077. In each of these molding dies, an opposed wall surface placed face-to-face to the inner guide sector 23 is provided, and the skin layer is formed between the inner guide sector 23 and the opposed wall surface.

Although the molding die disclosed in each of the above patent publications is effective for improvement of shape such as bending of the cell grid, outer diameter of the honeycomb structure is determined by the inner guide sector 23 and the opposed wall surface when the thickness of the skin layer is defined by these two components. For this reason, there is a problem in that it is very difficult to change the setting of outer diameter. Specifically, the shrinkage percentage of the product after drying may vary for each material lot, while both metal die and the guide ring must be replaced with those having suitable shrinkage percentage in order to maintain dimensional accuracy of the product.

To solve the above problems, it is an object of the present invention to provide a die for molding a honeycomb structure, which can be molded without causing the bending of the cell grid even when the honeycomb structure has a relatively thick skin layer, and also to provide a honeycomb structure having high strength and without bending on the cell grids.

SUMMARY OF THE INVENTION

To attain the above object, the die for molding a honeycomb structure according to the present invention comprises a metal die, having a feed hole forming unit provided with feed holes for feeding a molding material and a slot forming unit having slots, which are communicated with said feed holes and through which the honeycomb structure is extruded and molded, and a guide ring having an abutment surface placed face-to-face to a part of said slot forming unit via a clearance sector at outer peripheral edge of the metal die, an outer portion thereof being fixed on the metal die and an inner portion thereof being opened, whereby:

the slot forming unit of the metal die has an outer peripheral slot forming unit placed face-to-face to the guide ring and a main body slot forming unit positioned more inwardly than the outer peripheral slot forming unit, and a protruded surface protruding in extruding direction is formed between a main body end surface of the main body slot forming unit and outer peripheral end surface of the outer peripheral slot forming unit; and the shortest linear distance "d" between the protruded surface and the guide ring is greater than a clearance distance "c" of the clearance sector formed by outer peripheral end surface of the slot forming unit and the abutment surface of the guide ring.

It is noteworthy in the present invention that the above-mentioned clearance sector is provided between the metal die and the guide ring and the guide ring has the inner guide sector, while the metal die has the main body slot forming unit protruding more in extruding direction than the outer peripheral end surface and the shortest linear distance "d" is greater than the clearance distance "c".

In case the shortest linear distance "d" is smaller than the clearance distance "c", the skin layer is not formed smoothly, and split defects may occur on it.

The feed holes in the metal die can be provided at the same spacing as that of the slots or may be provided at spacing by more than two times as wide as the spacing between the slots. By adjusting the spacing of the feed holes, the conditions such as extrusion speed can be changed. It is preferable that the feed holes are formed to have round cross-sections to facilitate the working of a metal die builder, while the holes may have rectangular cross-sections.

The slots in the above-mentioned metal die are formed to be continuous with the outer peripheral slot forming unit, the protruded surface and the main body slot forming unit. The slot may be designed in various shapes such as rectangular, hexagonal, etc. to match the shape of the cell of the honeycomb structure to be produced.

Next, description will be given of the operation of the die according to the present invention. In the die for molding a honeycomb structure according to the present invention, there is provided the above-mentioned clearance sector between the metal die and the guide ring. For this reason, the molding material extruded from the metal die is formed to the skin layer having a thickness defined by the clearance distance at the clearance sector and it is extruded in radially inward direction.

The inner portion of the guide ring is opened. As a result, the molding material to form the skin layer extruded in radially inward direction is deflected toward axial direction of the honeycomb structure along the surface of the inner portion of the guide ring by extrusion force of the cell grid, which is extruded from the portion more inwardly than the guide ring.

For this reason, outer diameter of the honeycomb structure, i.e. outer diameter of the skin layer, is determined by inner diameter of the inner portion of the guide ring. Therefore, to cope with the change of shrinkage percentage due to drying of the honeycomb structure, it is simply necessary to change inner diameter of the inner portion of the guide ring. In this respect, there is no need to replace the entire molding die including the metal die with the one having different dimensions.

The metal die has the main body slot forming unit protruded in extruding direction via the protruded surface on inner side of the outer peripheral slot forming unit, and the slots for forming the cell grid are continuously provided. As a result, when the skin layer being extruded from the clearance sector toward inner periphery is deflected in axial direction of the honeycomb, the cell grid nearby is not bent or deformed.

Specifically, the skin layer formed at the clearance sector gives component force in radial direction on the cell grid, which is extruded from the metal die when it is deflected in axial direction from radial direction of the honeycomb structure. If this component force is greater than rigidity of the cell grid, which has just been formed, the cell grid is bent. In the present invention, however, the main body slot forming unit is protruded more in extruding direction than the outer peripheral end surface.

For this reason, the cell grid, receiving component force from the skin layer, is designed to be continuous to the cell grid immediately before being extruded and present in the slots of the main body slot forming unit, and it has higher rigidity than the conventional product. Therefore, the cell grid being under pushing pressure from the skin layer is not bent when the skin layer is deflected.

The above-mentioned shortest linear distance "d" is greater than the clearance distance "c". In this respect, the skin layer with the thickness defined by the clearance distance "c" of the clearance sector is subject to no unreasonable resistance at the time of deflection. Accordingly, no split defects occur on the skin layer, and the skin layer moves smoothly along outer periphery of the honeycomb structure.

Next, it is preferable that the guide ring is provided slidably in parallel to axial direction of the metal die. As a result, the clearance distance "c" of the clearance sector can be easily changed, and the thickness of the skin layer of the honeycomb structure can be easily adjusted.

It is preferable that a spacer for adjusting the clearance distance is placed between outer periphery of the guide ring and the metal die. In so doing, it is possible to easily change the clearance distance "c" of the clearance sector.

The relationship between the height "a" of the protruded surface and the height "b" of the outer peripheral slot forming unit is preferably: $a \leq 0.5 b$. This reliably prevents corrugation or twisting of the skin layer. On the other hand, if $a > 0.5 b$, resistance on slots of outer peripheral end surface which occurs when the molding material passes therethrough becomes too low compared with resistance which occurs when the same passes through the slots of the main body slot forming unit, then more molding material is unnecessarily extruded from the outer peripheral end surface. As a result, the skin layer forming speed becomes higher than the cell grid forming speed, and corrugation of the skin layer may occur.

The relationship between the clearance distance "c" and the height "a" of the protruded surface is preferably $c \leq a$. This can increase rigidity of the cell grid, which receives component force from the skin layer being extruded, and it is possible to reliably prevent the bending of the cell grid.

It is also preferable that the relationship between the clearance distance "c" and the shortest linear distance "d" is: $c < d < 3 c$. This makes it possible to prevent split defects and also to avoid bending of the cell grid. On the other hand, if $d \geq 3 c$, the effect to increase rigidity of the cell grid is low, and bending of the cell grid may occur when the skin layer is thick.

In the die for molding honeycomb structure as described above, the conditions for the honeycomb structure, which has no bending of the cell grid to be formed and has high compressive breaking strength are as follows: In a honeycomb structure integrally formed with cell grid, which constitutes honeycomb main body and a skin layer to cover outer periphery in axial direction of the cell grid, relationship between the thickness "k" of the cell grid and the thickness "s" of the skin layer should be $s \geq 2 k$.

In the honeycomb structure as described above, the thickness "s" of the skin layer is more than two times as thick as the thickness "k" of the cell grid. Further, no bending occurs on the cell grid because the grid is formed by the die for molding the honeycomb structure. As a result, even when the cell grid is designed thin enough in lightweight design, overall strength can be maintained by the skin layer, which is more than two times thicker.

The thickness "k" of the cell grid may be designed as 0.04 to 0.15 mm. In so doing, it is possible to have the entire honeycomb structure in extensively lightweight design.

BRIEF DESCRIPTION OF THE DRAWINGS

In the following, detailed description will be given on the present invention in connection with the attached drawings, in which:

FIG. 2 is a cross-sectional view of an essential portion of the molding die of the first embodiment;

DETAILED DESCRIPTION OF THE INVENTION

Figure 1:
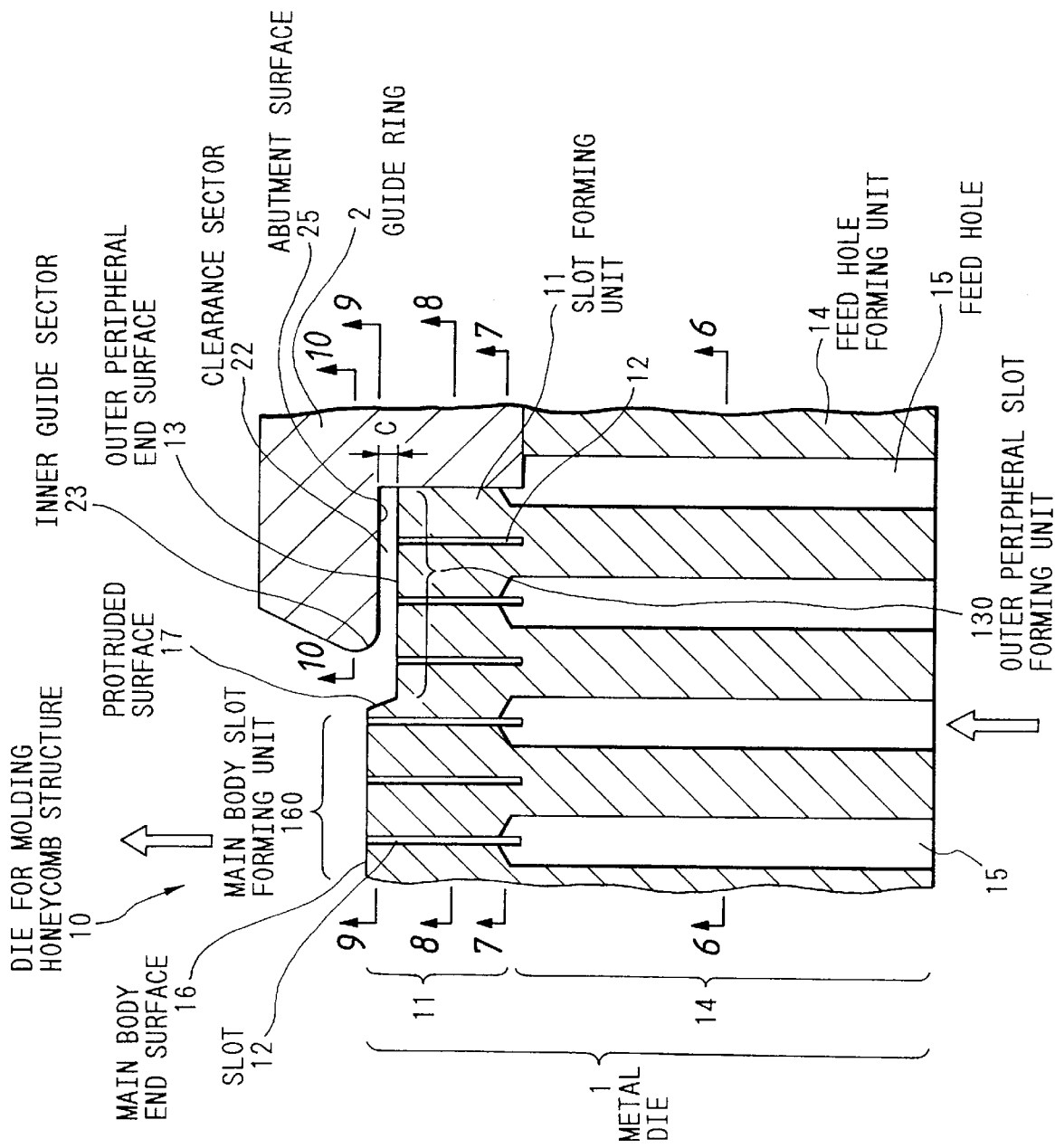
FIG. 1 is a partially cutaway cross-sectional view of a die for molding according to a first embodiment of the present invention.

In the following, detailed description will be given on the preferred embodiments of a molding die for molding a honeycomb structure of the present invention, referring to the drawings.

1. First Embodiment

Figure 3A:
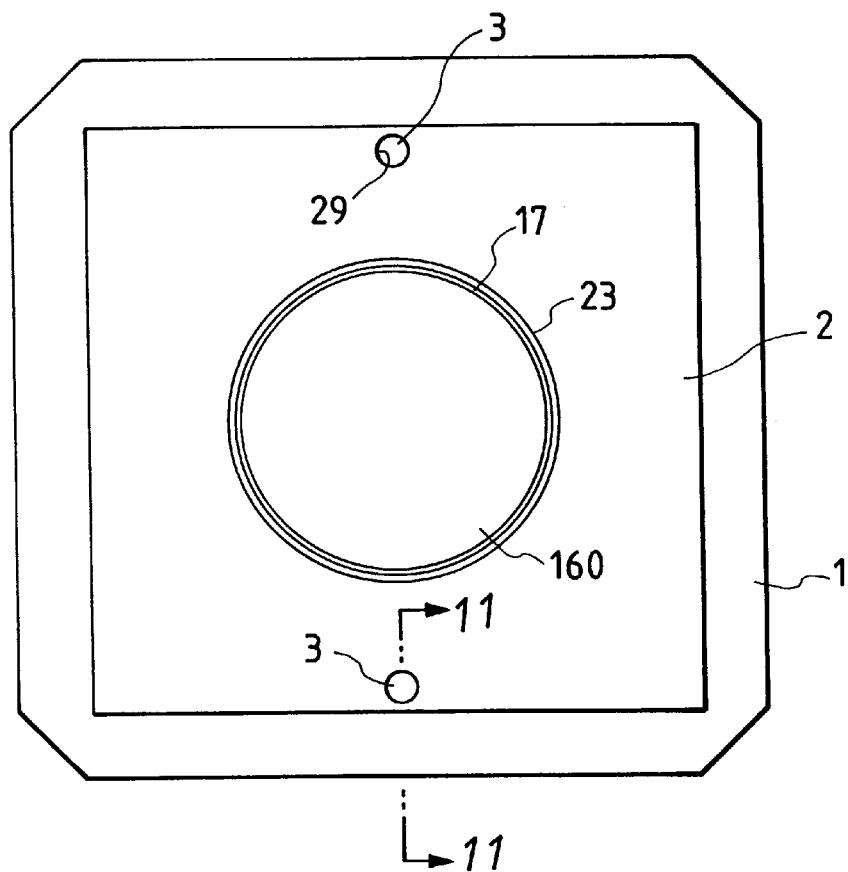
FIG. 3A is a plan view of the molding die of the first embodiment.
Figure 3B:
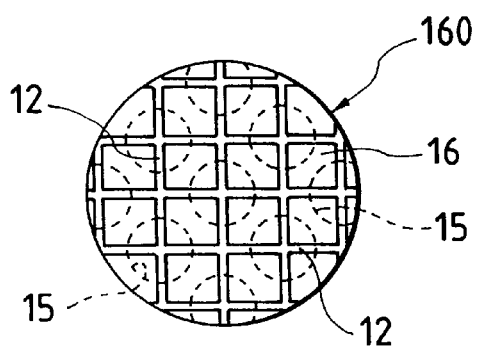
FIG. 3B is an enlarged plan view of a main body slot forming unit of the molding die.
Figure 4A:
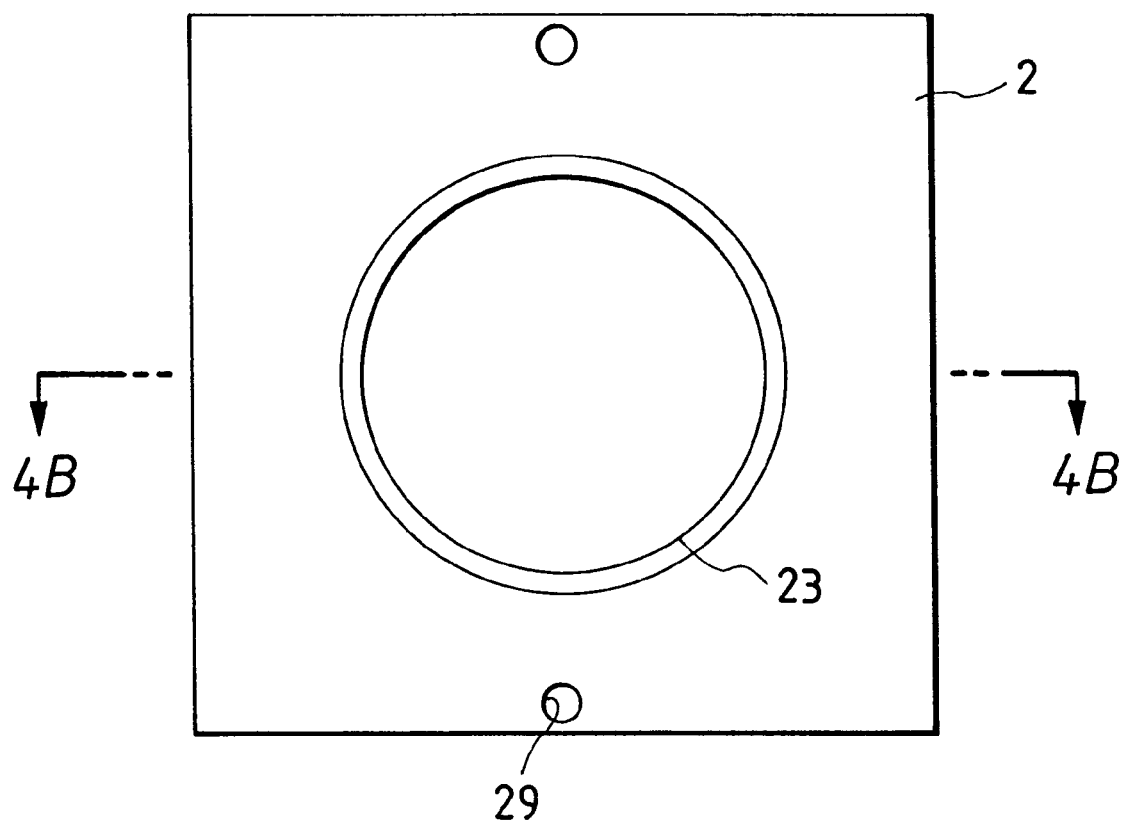
FIG. 4A is a plan view of the guide ring of the first embodiment.
Figure 4B:
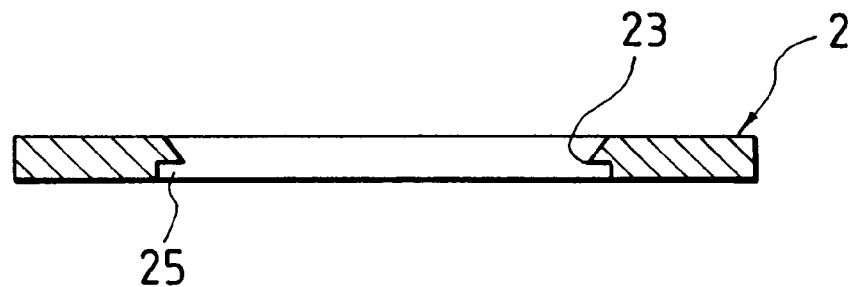
FIG. 4B is a cross-sectional view taken along the line 4B—4B in FIG. 4A.
Figure 5A:
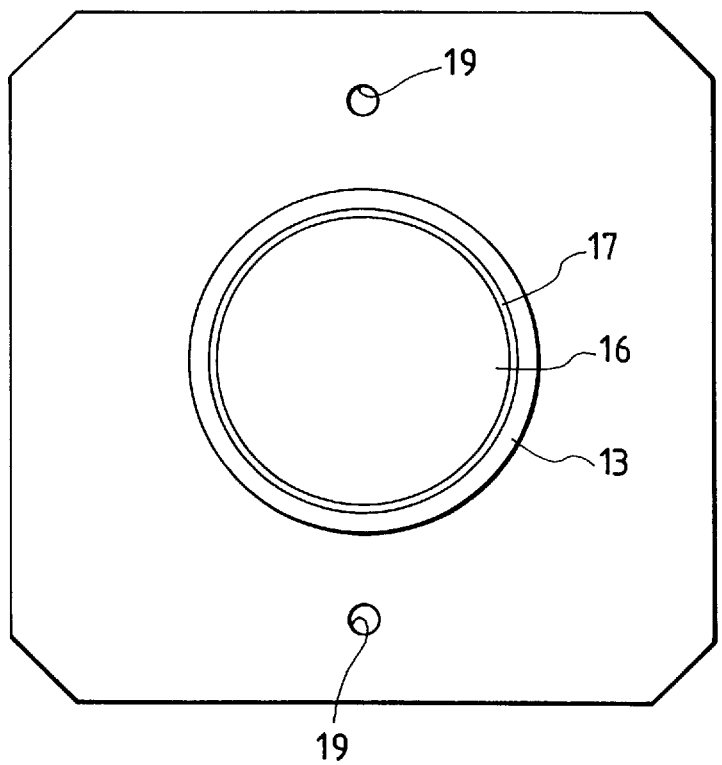
FIG. 5A is a plan view of the metal die in the first embodiment.
Figure 5B:
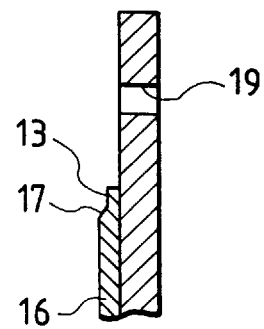
FIG. 5B is a partially cutaway cross-sectional view of the metal die.
Figure 5C:
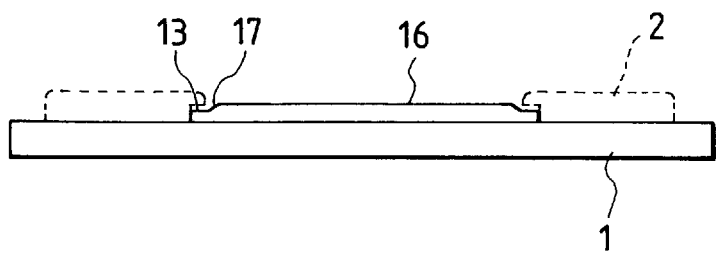
FIG. 5C is a front view of the metal die.

Description will be given on a die for molding a honeycomb structure of a first embodiment of the present invention in conjunction with FIG. 1 to FIG. 3.

As shown in FIG. 1 to FIG. 3A and FIG. 3B, a die 10 for molding a honeycomb structure of the present embodiment comprises a metal die 1, which integrally consists of a feed hole forming unit 14 provided with feed holes 15 for introducing a molding material and of a slot forming unit 11 provided with slots 12 communicated with the feed holes 15 and used for extruding and molding the honeycomb structure, and a guide ring 2 placed face-to-face to a part of the slot forming unit 11 and arranged to face toward the metal die 1 via a clearance sector 22.

Figure 9:
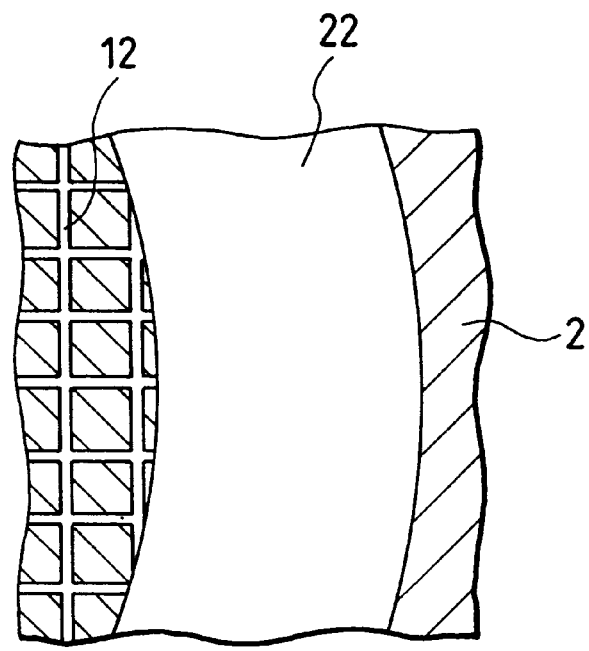
FIG. 9 is a cross-sectional view taken along the line 9—9 in FIG. 1.

The slot forming unit 11 comprises a main body slot forming unit 160 constituting the main body of the honeycomb structure and an outer peripheral slot forming unit 130, which mainly forms a skin layer of the honeycomb structure. In the clearance sector 22, as shown in FIG. 1 and FIG. 2, the outer peripheral slot forming unit 130 has an outer peripheral end surface 13 running perpendicularly to the extruding direction of the honeycomb structure. On the other hand, the guide ring 2 is provided with an abutment surface 25, with which the molding material extruded from the outer peripheral slot forming unit 130 is brought into contact and which is formed in parallel to the outer peripheral end surface 13. On the guide ring 2, the outer peripheral end surface 13 and the abutment surface 25 define a clearance sector 22, which is designed in form of a doughnut and determines thickness of the skin layer (FIG. 9).

As shown in FIGS. 1 to 3A, 3B, 4A and 4B, the guide ring 2 is fixed on outer portion of the metal die 1 and its inner portion is opened. On its inner portion, there is provided an inner guide sector 23, which guides outer periphery of the skin layer in axial direction of the honeycomb structure.

On the other hand, as shown in FIGS. 1 to 3A, 3B, 5A, 5B and 5C, there is provided, on the metal die 1, a main body slot forming unit 160 for forming main body, positioned more inwardly than inner periphery of the guide ring 2 and protruded in extruding direction than the outer peripheral end surface 13. A protruded surface (or a graded step) 17 is provided between the main body end surface 16 of the main body slot forming unit 160 and the outer peripheral end surface 13.

Figure 6:
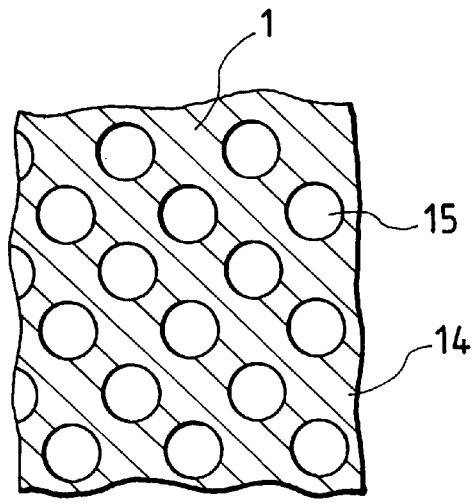
FIG. 6 is a cross-sectional view taken along the line 6—6 in FIG. 1.
Figure 7:
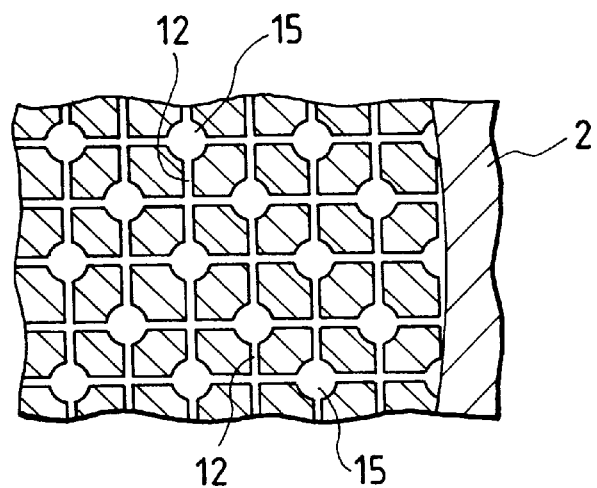
FIG. 7 is a cross-sectional view taken along the line 7—7 in FIG. 1.
Figure 8:
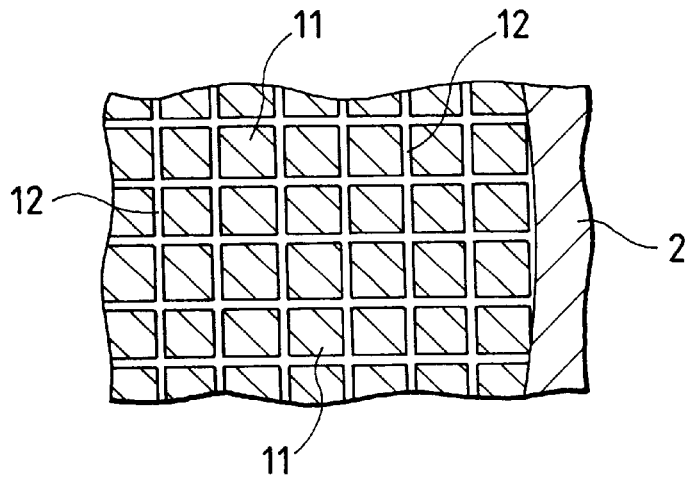
FIG. 8 is a cross-sectional view taken along the line 8—8 in FIG. 1.
Figure 10:
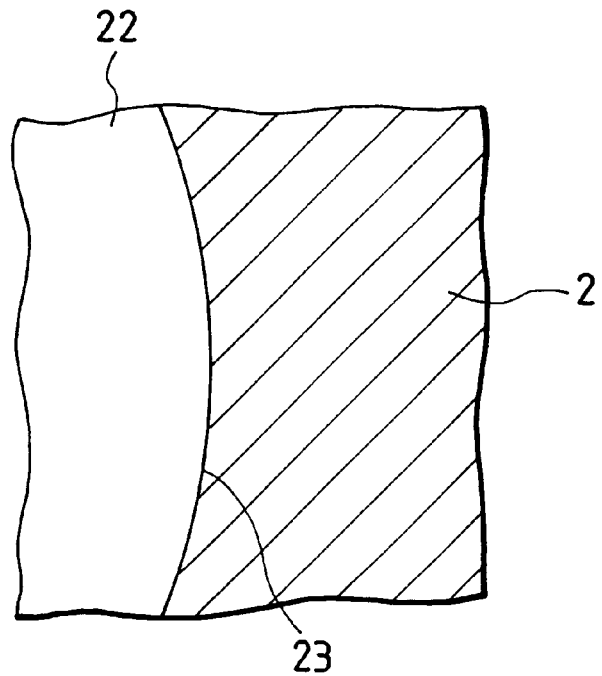
FIG. 10 is a cross-sectional view taken along the line 10—10 in FIG. 1.

As shown in FIGS. 6 to 8, each of the feed holes 15 of the feed hole forming unit 14 on the metal die 1 is designed to have round cross-section (FIG. 6), and these holes are communicated with the slots 12 in form of grid at upper portion (FIG. 7) and are further turned to the slot forming unit 11 comprising only the slots 12 on the uppermost portion (FIG. 8). Going upward further, a doughnut-like clearance sector 22 is provided on outer peripheral edge of the metal die 1 as shown in FIGS. 9 and 10.

As is evident from FIG. 2, the shortest linear distance between the protruded surface 17 and the inner guide sector 23, i.e. the shortest linear distance "d" between the protruded surface 17 and the guide ring 2, is designed to be greater than the clearance distance "c" of the clearance sector 22.

Further, it is designed that the relationship between the clearance distance "c" and the shortest linear distance d is: $c<d<3c$.

Figure 12:
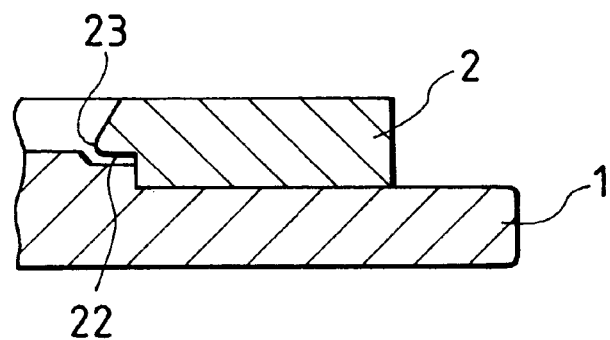
FIG. 12 is a drawing to show a different fixing method of the metal die with the guide ring in the first embodiment.
Figure 13:
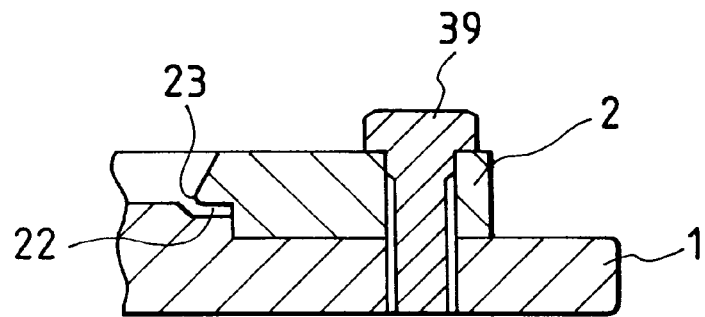
FIG. 13 is a drawing to show another different fixing method of the metal die with the guide ring in the first embodiment.

The guide ring 2 is slidably arranged in parallel to axial direction with respect to the metal die 1. Specifically, as shown in FIGS. 3A, 3B, 4A, 4B, 5A, 5B and 5C and in FIG. 11, the metal die 1 and the guide ring 2 are fixed by engaging pins 3 in pin holes 19 and 29 in parallel to axial direction respectively. Therefore, the guide ring 2 can be slid in axial direction of the metal die 1. As the fixing method, a simple engaging method shown in FIG. 12, a bolt fastening method using a bolt 39 as shown in FIG. 13 or various other methods may be used.

As shown in FIG. 2, it is designed in such manner that the height "a" of the protruded surface and the height "b" of the outer peripheral slot forming unit 130 will be: $a \leq 0.5 b$. The relationship between the clearance distance "c" and the height "a" of the protruded surface is to be $c \leq a$.

As the above-mentioned heights "a" and "b" as well as the distances "c" and "d" may be used the following values respectively:

a=1.1 mm, b=2.4 mm, c=0.5 mm, d=1.0 mm

Next, description will be given on the operation and the advantageous effect in the first embodiment. In the die 10 for molding a honeycomb structure of the present embodiment, the clearance sector 22 is provided between the metal die 1 and the guide ring 2. As a result, the molding material extruded to the clearance sector 22 forms the skin layer, which has a thickness defined by the clearance distance "c". (see the second embodiment.) Namely, the thickness of the skin layer can be determined by the dimension of the clearance distance "c".

The guide ring 2 is slidably arranged in parallel to axial direction with respect to the metal die 1. This makes it possible to easily change the clearance distance "c" and to readily adjust the thickness of the skin layer.

The inner portion of the guide ring 2 is opened and has the inner guide sector 23. As a result, the molding material for forming the skin layer formed at the clearance sector 22 is extruded in radially inward direction and is deflected in axial direction of the honeycomb structure along the inner guide sector 23 by pushing force of the cell grid.

For this reason, outer diameter of the honeycomb structure, i.e. outer diameter of the skin layer, is determined by inner diameter of the inner guide sector 23 of the guide ring 2. In this respect, the change of shrinkage percentage of the honeycomb structure due to drying can be easily coped with by simply changing inner diameter of the inner guide sector 23 of the guide ring 2, and there is no need to replace the entire molding die including the metal die with the one with different dimensions as in the conventional product.

The metal die 1 has, on inner peripheral side of the outer peripheral end surface 13, the main body slot forming unit 160, which is protruded in extruding direction via the protruded surface 17. The slots 12 for forming the cell grid are continuously provided on it. The clearance distance "c", the height "a" of the protruded surface, and the shortest linear distance "d" meet the relationship: $c<d<3c$ and $c \leq a$. As a result, the cell grid extruded from the outer peripheral slot forming unit 130 has higher rigidity than the conventional product where there are provided neither the main body slot forming unit 160 nor the protruded surface 17. Therefore, when the skin layer being extruded from the clearance sector 22 toward inner periphery is deflected in axial direction of the honeycomb structure, the cell grid at nearby position is neither bent nor deformed.

The shortest linear distance "d" is greater than the clearance distance "c". For this reason, the skin layer undergoes no unreasonable resistance when deflected and split defects do not occur. Further, because of the above relationship $a \leq 0.5 b$, the skin layer forming speed is in harmony with the cell grid forming speed, and corrugation or twisting of the skin layer does not occur.

2. Second Embodiment

Figure 14:
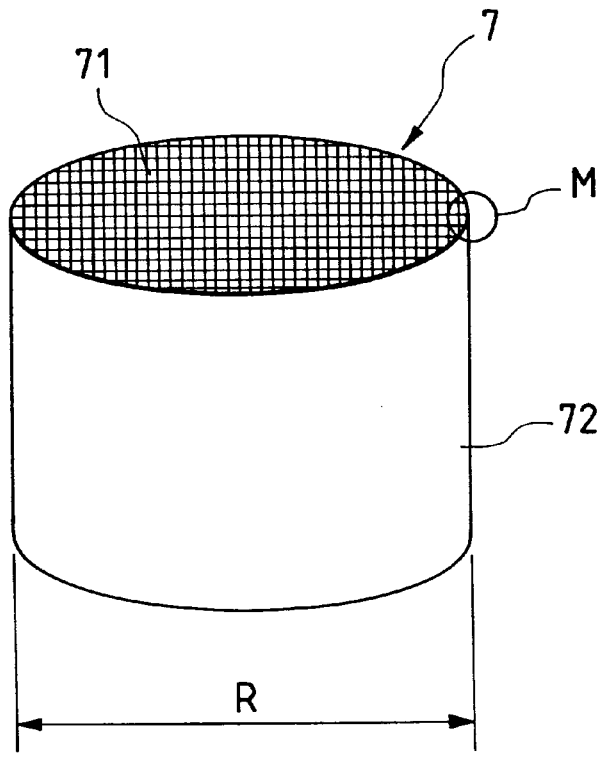
FIG. 14 is a perspective view of the honeycomb structure of a second embodiment of the invention.
Figure 15:
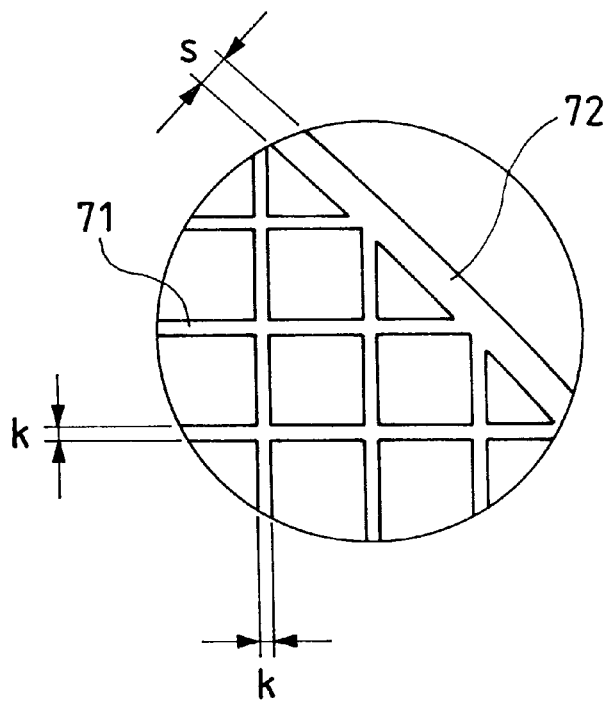
FIG. 15 is an enlarged plan view of an outer peripheral portion M of the honeycomb structure in FIG. 14.
Figure 16:
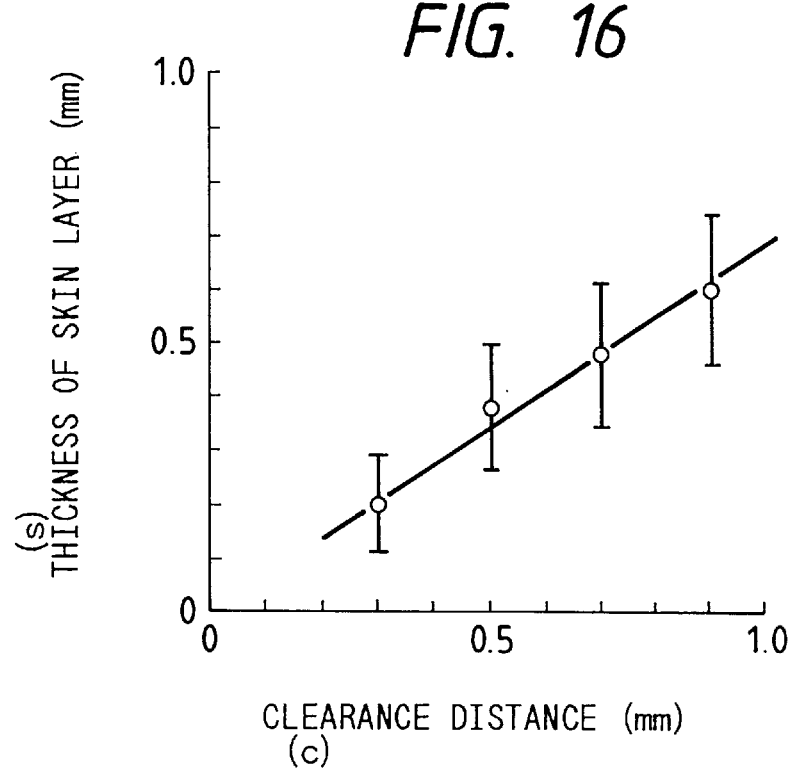
FIG. 16 is a diagram showing relationship between clearance distance and thickness of a skin layer in the second embodiment.

As shown in FIGS. 14 to 16, using the die 10 for molding the honeycomb structure of the first embodiment, the relationship between the clearance distance "c" and the thickness of the skin layer was determined in the second embodiment. The molded product was a honeycomb structure 7 made of cordierite ceramics used as catalyst support for purification of automobile exhaust gas as shown in FIG. 14.

To produce the above honeycomb structure 7, ceramic material was selected, which consists of kaolin, talc, alumina, and aluminum hydroxide as the starting materials. To 100 weight parts of these ceramic materials, 7 weight parts of organic components including bonding agents and lubricants and 21 weight parts of water were added. These were kneaded well to prepare the molding material.

The metal die was designed to have the number of honeycomb cells being 400 cells/inch$^2$ and thickness of cell grid being 0.10 mm. The clearance distance "c" of the clearance sector formed between the metal die and the guide ring was sequentially changed, and the thickness "s" of the formed skin layer 72 was determined (FIG. 15).

The results are summarized in FIG. 16. In FIG. 16, the clearance distance "c" was taken on axis of abscissa and the thickness "s" of the skin layer 72 was taken on axis of ordinate. As it is evident from FIG. 16, the thickness "s" of the skin layer 72 is almost primarily determined by the clearance distance "c" and is proportional to it. Therefore, the thickness of the skin layer 72 can be controlled by the clearance distance "c".

3. Third Embodiment

Figure 17:
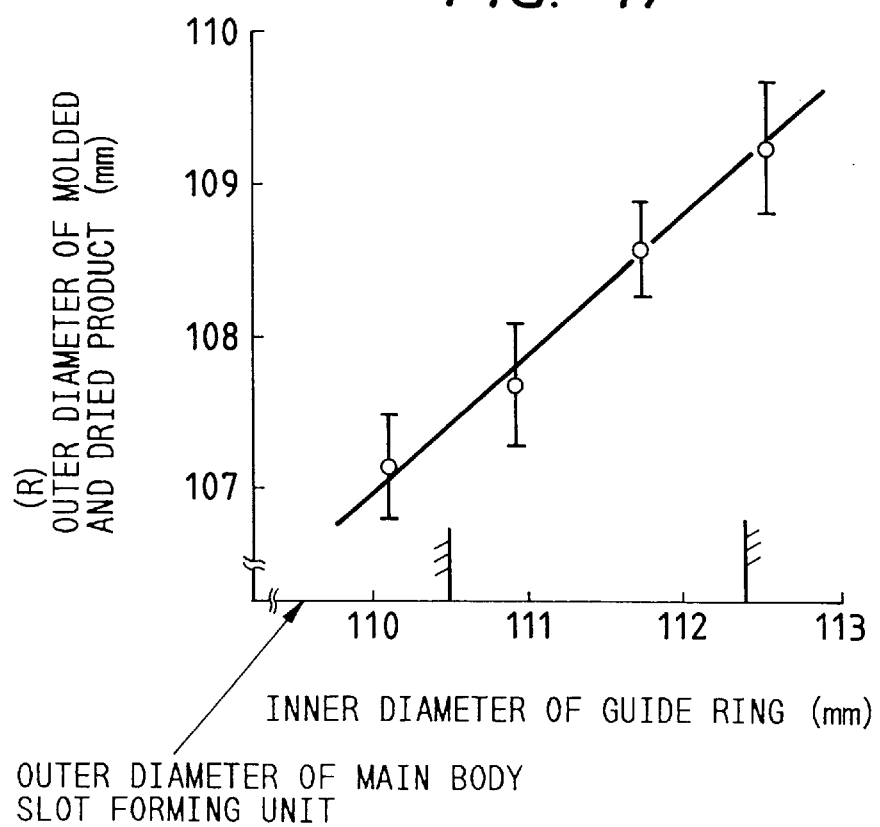
FIG. 17 is a diagram showing relationship between inner diameter of the guide ring and outer diameter of the honeycomb structure after drying in a third embodiment of the invention.

In the third embodiment, the relationship between inner diameter of the guide ring 2, i.e. inner diameter of the inner guide sector 23, and outer diameter of dried honeycomb structure was determined using the die 10 for molding honeycomb structure of the first embodiment as shown in FIG. 17.

Similarly to the second embodiment, the molded product was a honeycomb structure 7 made of cordierite ceramics as shown in FIG. 14. The molding material was also the same as in the second embodiment. The inner diameter of the guide ring 2 (i.e. inner diameter of the inner guide sector 23) was sequentially changed, and outer diameter R of the honeycomb structure after molded and dried (FIG. 14) was measured.

The results are shown in FIG. 17. In FIG. 17, inner diameter of the guide ring was taken on axis of abscissa, and outer diameter R after molding and drying of the honeycomb structure was taken on axis of ordinate. As it is evident from FIG. 17, outer diameter of the honeycomb structure is approximately proportional to inner diameter of the guide ring. Accordingly, it is possible to control outer diameter of the honeycomb structure by adjusting inner diameter of the guide ring.

In connection with the results of the second embodiment, the thickness "s" of the skin layer 72 is approximately determined depending upon the clearance distance "c", the difference between the shortest linear distance "d" from the inner guide sector 23 to the protruded surface 17 and the clearance "c" can be referred as a degree of freedom in reducing the inner diameter of the guide ring 2. Therefore, by preparing two or more types of guide rings having different inner diameters within the degree of freedom with respect to one type of metal die, it is possible to easily change outer diameter of the honeycomb structure.

However, when inner diameter of the guide ring is increased and the shortest linear distance "d" is by more than 3 times longer than the clearance distance "c", rigidity of the cell grid 71 near the skin layer 72 becomes lower, and bending may occur on the cell grid 71 as in the conventional product.

4. Fourth Embodiment

Figure 18:
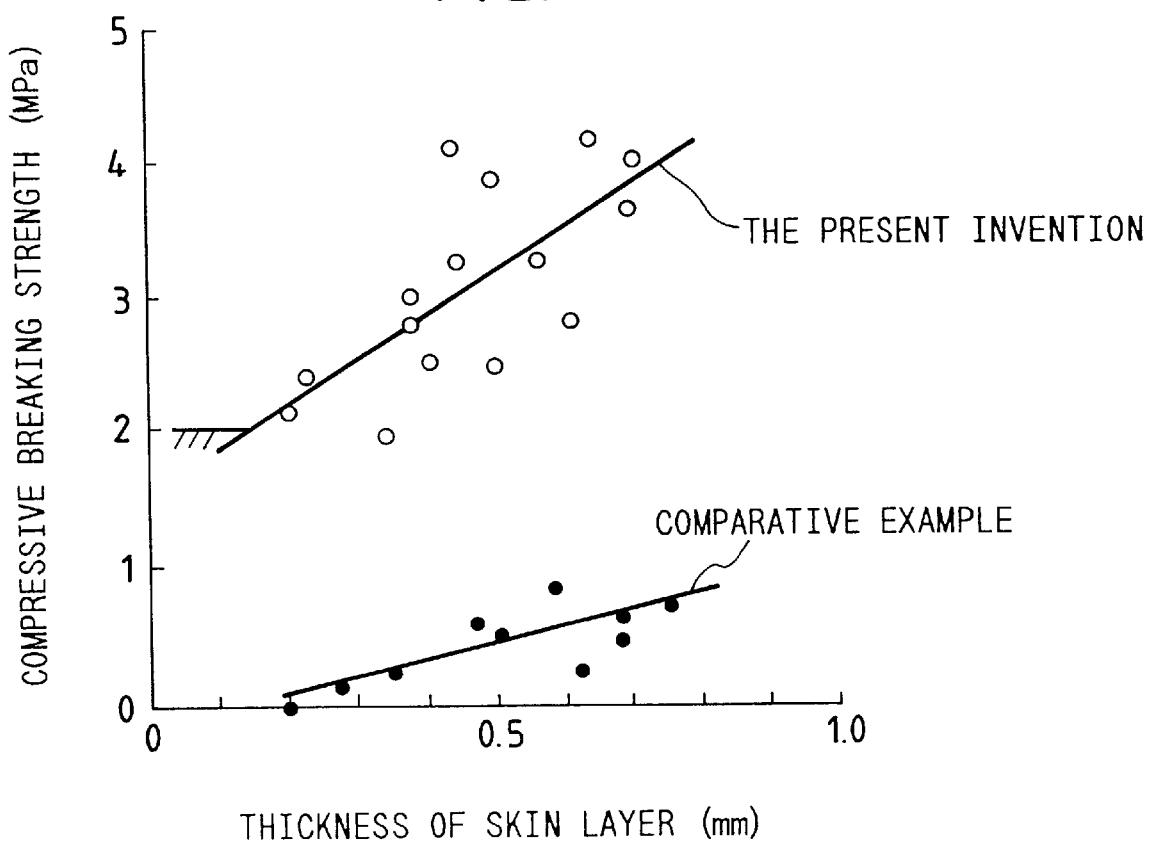
FIG. 18 represents a diagram showing relationship between thickness of the skin layer and compressive breaking strength of the honeycomb structure of a fourth embodiment of the invention.
Figure 29:
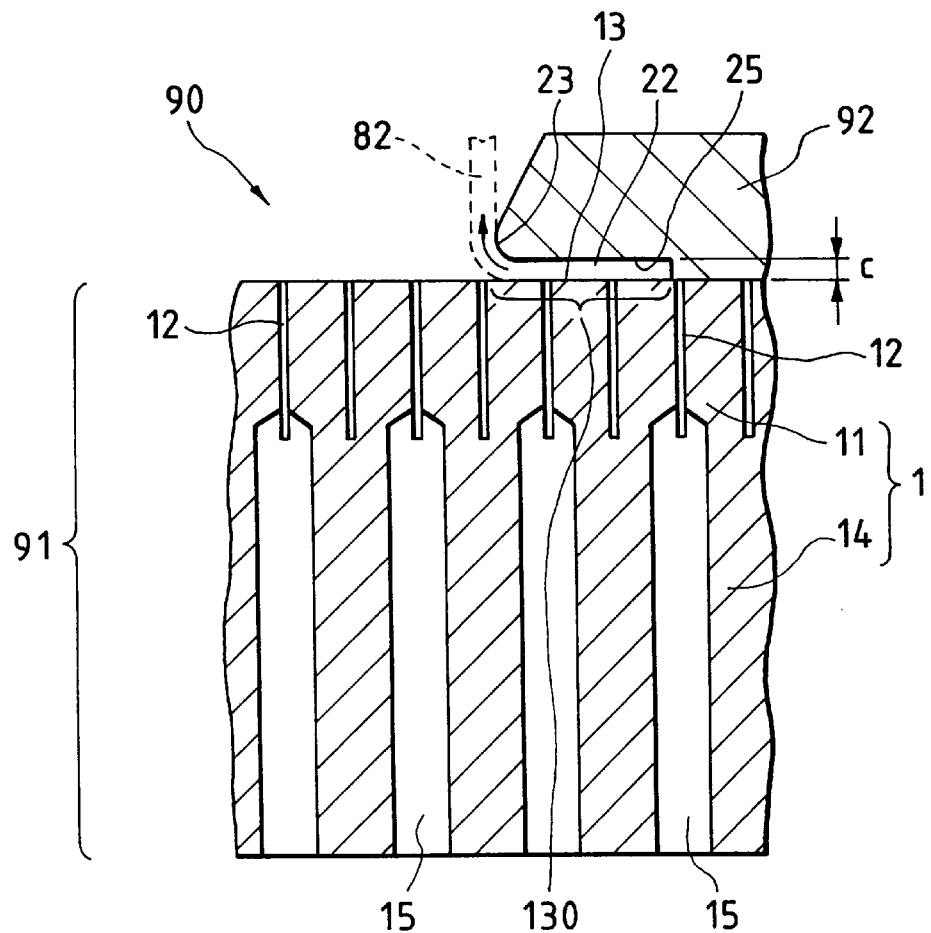
FIG. 29 is a cross-sectional view of an essential portion of the molding die in a conventional type product.
Figure 30:
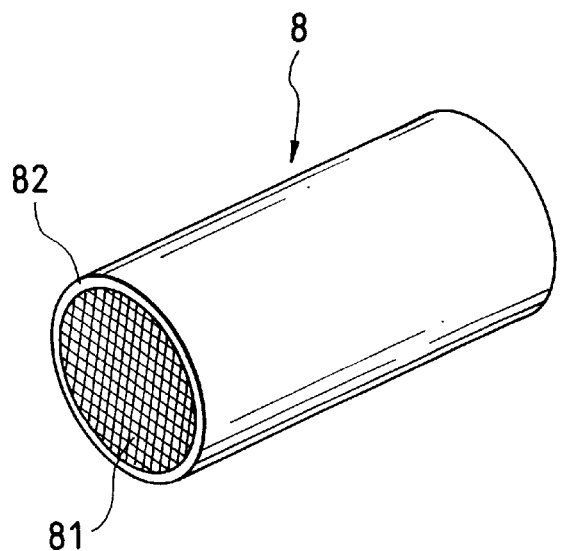
FIG. 30 is a perspective view of a conventional type honeycomb structure.

As shown in FIG. 18, using the die 10 for molding the honeycomb structure of the first embodiment, compressive breaking strength of the honeycomb structure was determined for different thickness dimensions of the skin layer in the fourth embodiment. For comparison purpose, the same measurement was performed on the honeycomb structure, which was prepared using the conventional type die 90 for molding honeycomb structure without the main body slot forming unit and the protruded surface as shown in FIG. 29.

The honeycomb structure thus prepared was molded by dies 10 and 90 for molding using the same molding material and fired as in the second embodiment, and the thickness "k" of the cell grid was set to 0.10 mm (FIG. 15). The thickness "s" of the skin layer (FIG. 15) was changed within the range of about 0.2 mm to 0.75 mm.

The compressive breaking strength was determined by hydrostatic compressive breaking strength test. The results are shown in FIG. 18. The thickness "s" of the skin layer was taken on axis of abscissa and compressive breaking strength was taken on axis of ordinate. As it is evident from FIG. 18, the honeycomb structure produced using the die 10 for molding according to the present invention showed compressive breaking strength of more than 2 MPa within the entire range of the measurement, exhibiting very satisfactory performance characteristics. The strength showed improvement with the increase of the thickness of the skin layer.

On the other hand, in the honeycomb structure produced using the conventional type molding die 90, the results were unsatisfactory in the entire range of measurement, being lower than 2 MPa, although the strength improved with the increase of the thickness of the skin layer. In the cases of the conventional type product, destruction mode was often seen as local depression found at the bending on the cell grid.

Specifically, the above difference may have occurred because, in the honeycomb structure produced using the molding die 10 of the present invention, almost no bending occurred on the cell grid, while, in the honeycomb structure produced by the conventional type molding die 90, many bendings were found on the cell grid, and bending stress was concentrated on these points. Therefore, in case the thickness "k" of the cell grid is as thin as 0.10 mm and the skin layer with thickness "s" thicker by two times or more is formed, it is evident that the structure of the molding die of the present invention is very advantageous compared with the conventional type die.

5. Fifth Embodiment

Figure 19:
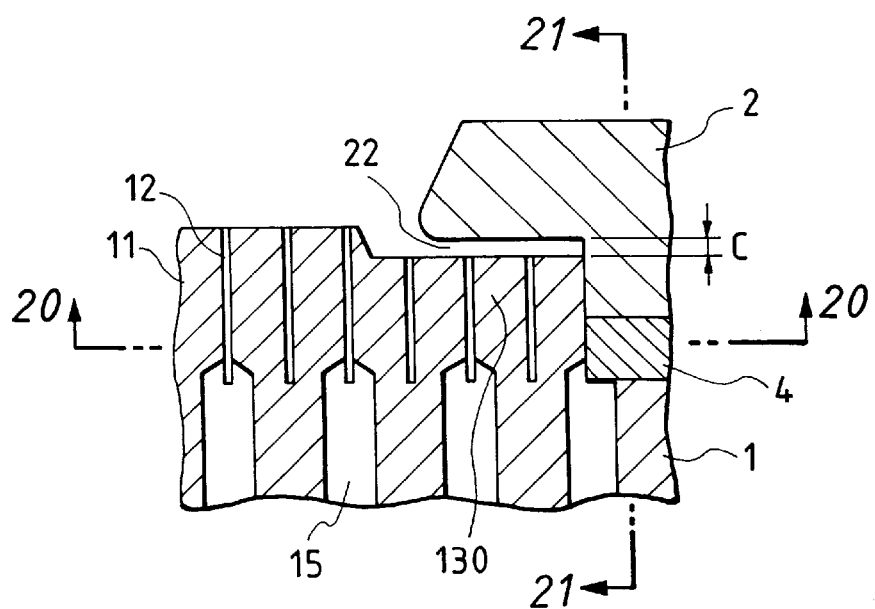
FIG. 19 is a cross-sectional view of an essential portion of the molding die in a fifth embodiment of the invention.
Figure 20:
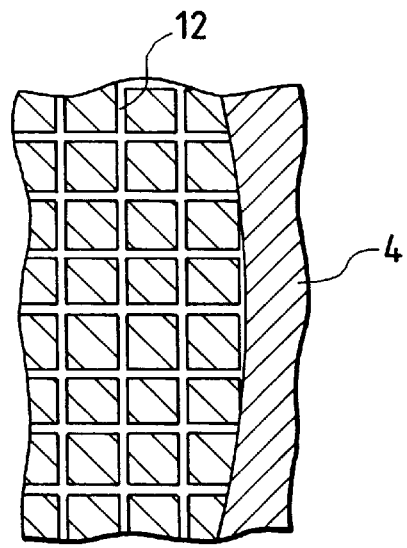
FIG. 20 is a cross-sectional view taken along the line 20—20 in FIG. 19.
Figure 21:
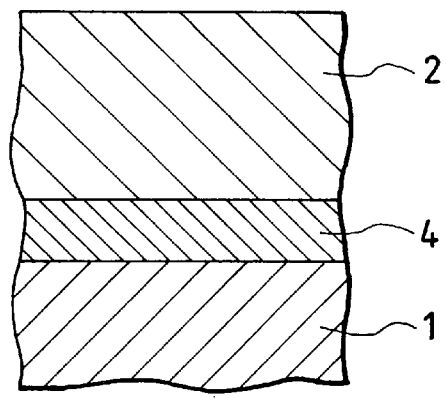
FIG. 21 is a cross-sectional view taken along the line 21—21 in FIG. 19.

In the fifth embodiment, a spacer 4 for adjusting the clearance distance is arranged between the metal die 1 and outer peripheral portion of the guide ring 2 in the molding die 10 of the first embodiment as shown in FIG. 19 to FIG. 21. The spacer 4 is in ring-like shape. In other features, it is the same as in the first embodiment.

In this case, several types of spacers 4 with different thickness dimensions is prepared in advance, and by exchanging these spacers with each other, it is possible to easily change the clearance distance "c", i.e. the thickness "s" of the skin layer (FIG. 15). (See the second embodiment.) Further, the same effects as in the first embodiment are obtained.

6. Sixth Embodiment

Figure 11:
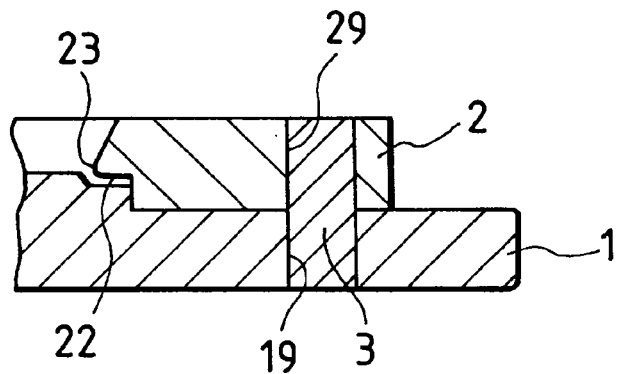
FIG. 11 is a cross-sectional view taken along the line 11—11 in FIG. 3A.
Figure 22:
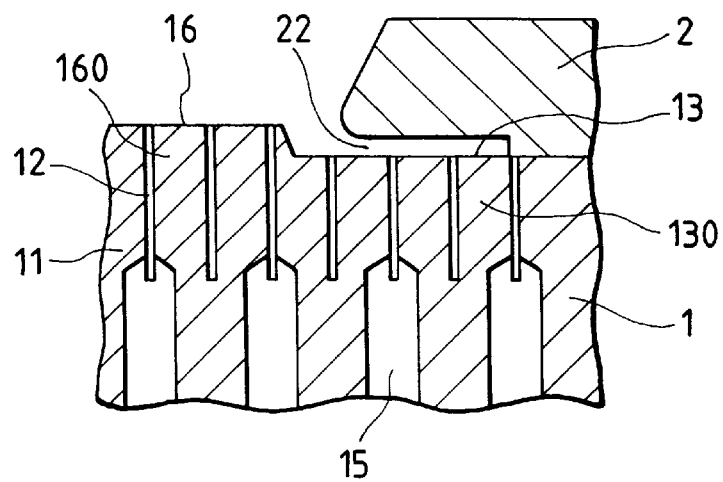
FIG. 22 is a cross-sectional view of an essential portion of the molding die in a sixth embodiment of the invention.

In the sixth embodiment, the guide ring 2 is brought into direct contact with the outer peripheral end surface 13 of the metal die 1 and is fixed by pin on outer periphery in the molding die 10 of the first embodiment as shown in FIG. 22 (see also FIG. 11.). In other features, it is the same as in the first embodiment. In this case, it is possible to increase effective outer diameter of the metal die 1 and also to increase the potential to extend outer diameter of the honeycomb structure. Further, the same effects as in the first embodiment can be obtained.

7. Seventh Embodiment

Figure 23:
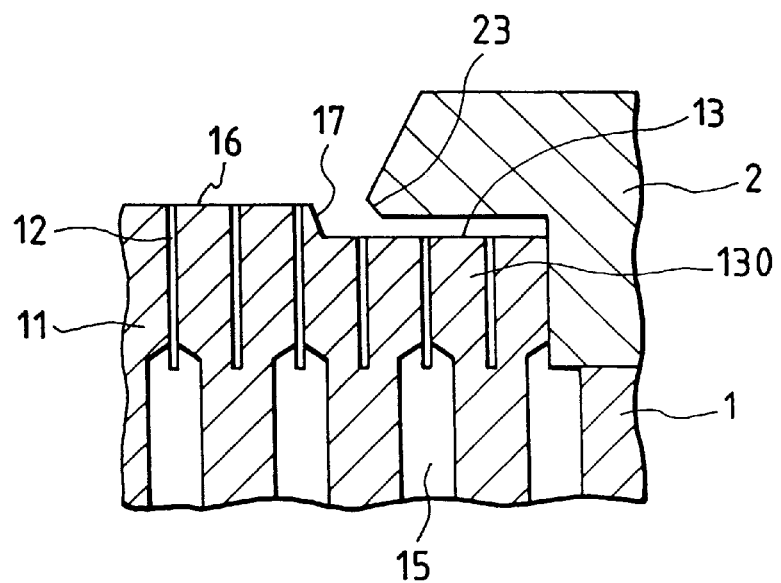
FIG. 23 is a cross-sectional view of an essential portion of the molding die in a seventh embodiment of the invention.

In the seventh embodiment, the shape of the inner guide sector 23 of the guide ring 2 is turned from arcuate curved surface to planar shape in the molding die 10 of the first embodiment as shown in FIG. 23. In other features, it is the same as in the first embodiment. In this case, it is possible to easily produce the guide ring 2 and to reduce the total cost for the production of the molding die 10. Further, the same effects as in the first embodiment can be obtained.

8. Eight Embodiment

Figure 24:
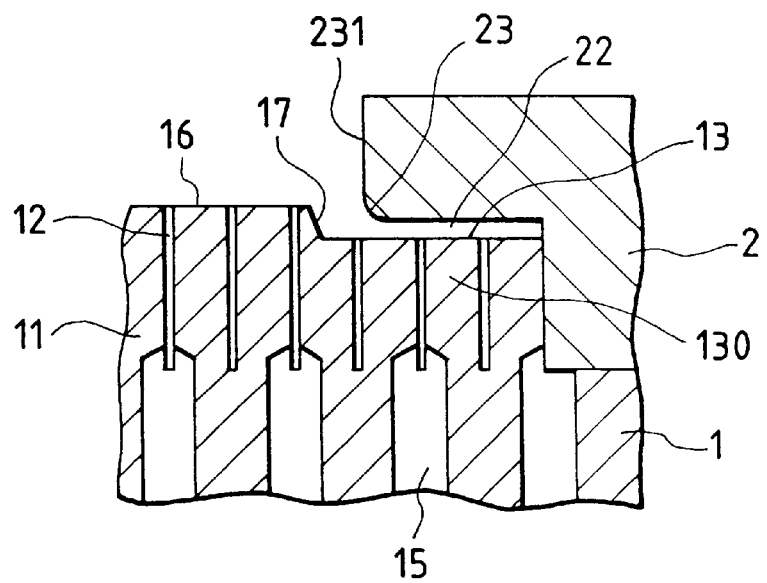
FIG. 24 is a cross-sectional view of an essential portion of the molding die in an eighth embodiment of the invention.

In the eighth embodiment, an upper wall 231 above the inner guide sector 23 of the guide ring 2 is changed from sharply inclined shape to vertical shape in the molding die 10 of the first embodiment as shown in FIG. 24. In other features, it is the same as in the first embodiment. In this case, slight plane resistance is generated due to contact of outer surface of the skin layer with the upper wall 231, but there is no substantial problem, and the same effects as in the first embodiment are obtained.

9. Ninth Embodiment

Figure 25:
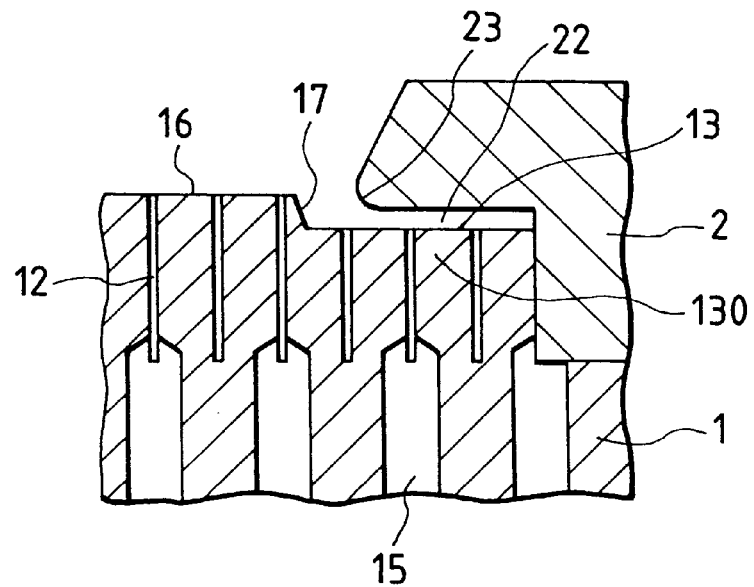
FIG. 25 is a cross-sectional view of an essential portion of the molding die in a ninth embodiment of the invention.

In the ninth embodiment, cross-sectional shape of the protruded surface 17 of the metal die 1 is changed from obtuse-angled shape to vertical shape in the molding die 10 of the first embodiment as shown in FIG. 25. The other features are the same as in the first embodiment. In this case again, the same effects as in the first embodiment can be obtained.

10. Tenth Embodiment

Figure 26:
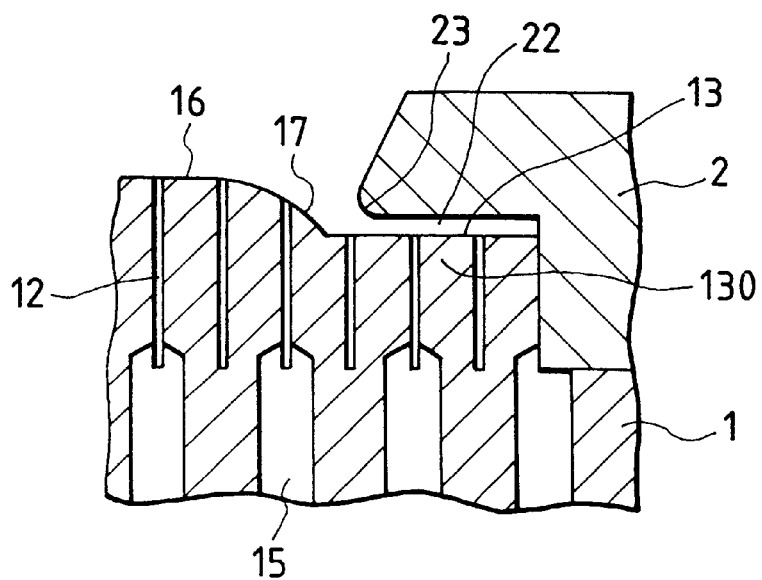
FIG. 26 is a cross-sectional view of an essential portion of the molding die in a tenth embodiment of the invention.

In the tenth embodiment, cross-sectional shape of the protruded surface 17 of the metal die 1 is changed from obtuse-angled shape to arcuate curved shape in the molding die 10 of the first embodiment as shown in FIG. 26. The other features are the same as in the first embodiment. In this case again, the same effects as in the first embodiment can be obtained.

11. Eleventh Embodiment

Figure 27:
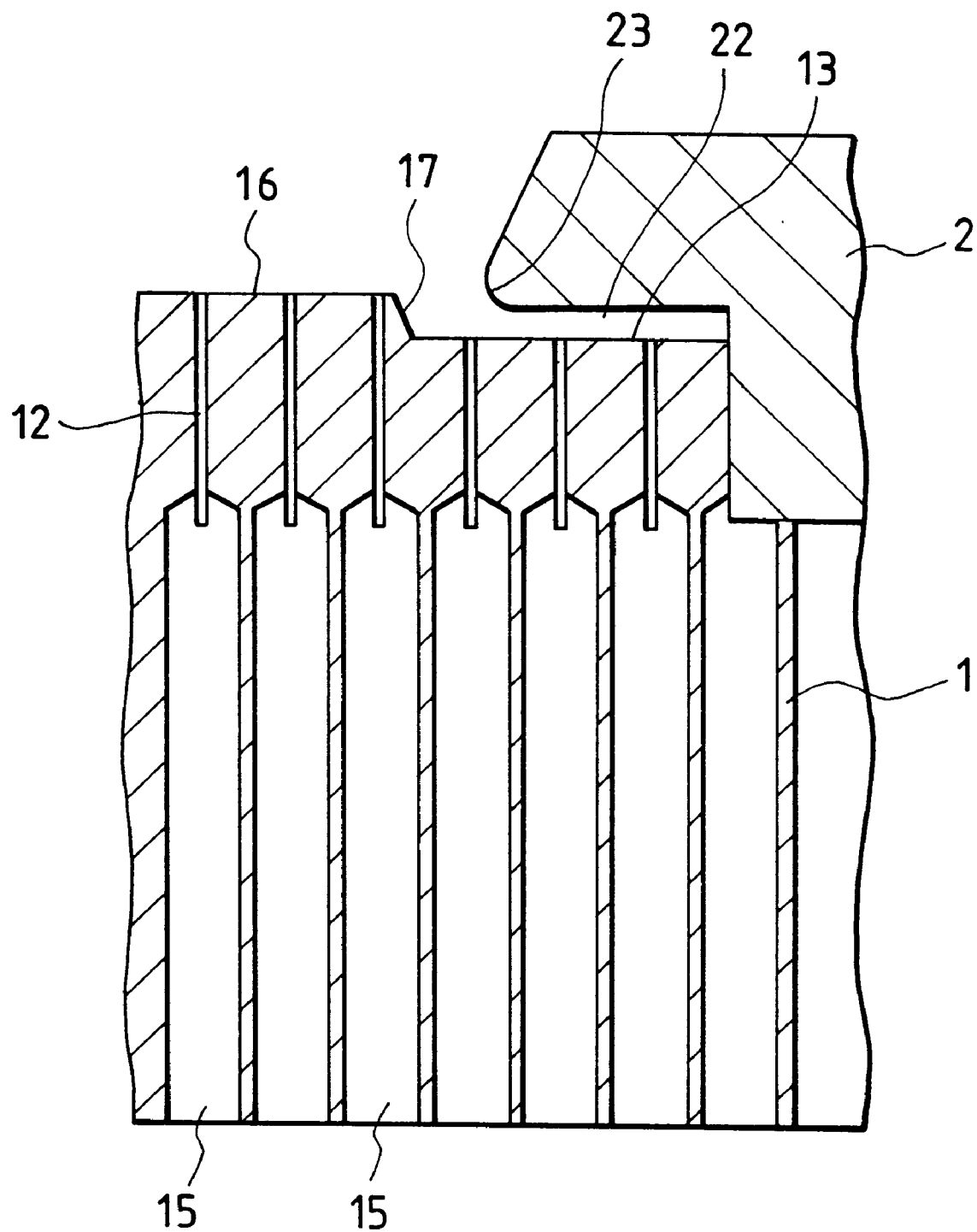
FIG. 27 is a cross-sectional view of an essential portion of the molding die in an eleventh embodiment of the invention.

In the eleventh embodiment, the feed holes 15 of the metal die 1 are arranged at the spacings as those of the slots 12 in the molding die 10 of the first embodiment as shown in FIG. 27. The other features are the same as in the first embodiment. In this case, it is possible to increase extrusion speed of the honeycomb structure. Further, the same effects as in the first embodiment can be obtained.

12. Twelfth Embodiment

Figure 28:
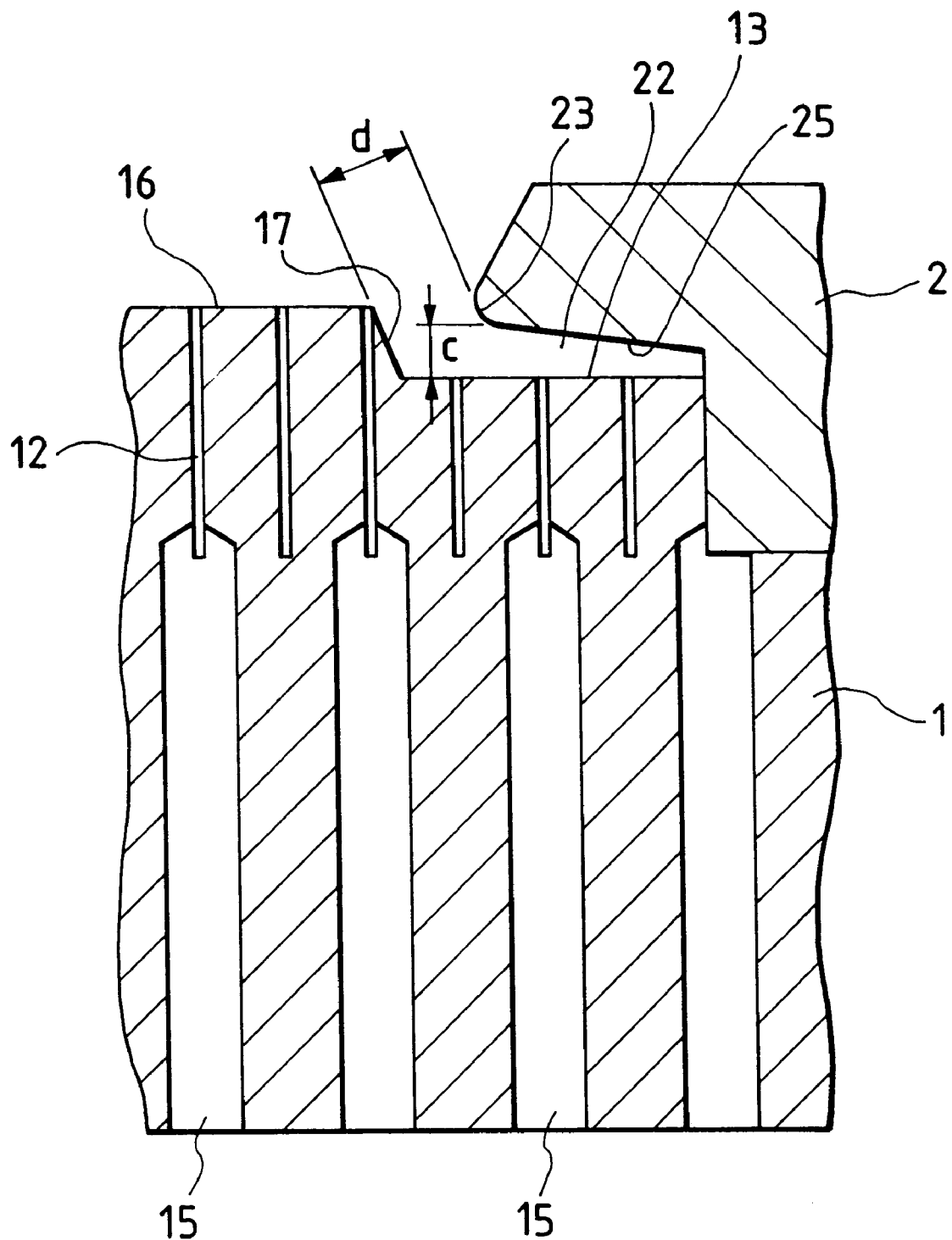
FIG. 28 is a cross-sectional view of an essential portion of the molding die in a twelfth embodiment of the invention.

In the twelfth embodiment, the abutment surface 25 of the guide ring 2 is inclined slightly toward the extruding direction with respect to the outer peripheral end surface 13, i.e. not to be in parallel to it, in the molding die of the first embodiment as shown in FIG. 28. The other features are the same as in the first embodiment.

In this case again, the shortest linear distance "d" between the protruded surface 17 and the guide ring 2 is greater than the maximum clearance distance "c" of the clearance sector 22. Thus, it is possible to prevent defective quality such as split defects. Further, the same effects as in the first embodiment can be obtained.

As described above, it is possible according to the present invention to provide a die for molding a honeycomb structure without causing bending of the cell grid even when the honeycomb structure has relatively thick skin layer, and also to provide a honeycomb structure, which can promptly cope with changes in shrinkage percentage of the product, and which has no bending on the cell grid and has high strength.

What is claimed is:

1. A die for molding a honeycomb structure, comprising:

a metal die having a feed hole unit provided with feed holes for feeding a molding material and a slot forming unit having slots, which communicate with said feed holes and through which the honeycomb structure is extruded and molded; and a guide ring having an abutment surface placed face-to-face to a portion of said slot forming unit across a clearance sector on an outer peripheral edge of said metal die, an outer portion of said guide ring being fixed on said metal die and an inner portion thereof being spaced from said metal die;

said slot forming unit of said metal die having an outer peripheral slot forming unit placed face-to-face to said guide ring and a main body slot forming unit positioned inwardly of said outer peripheral slot forming unit, and a protruded surface protruding in an extruding direction of said molding material and being formed between a main body end surface of said main body slot forming unit and an outer peripheral end surface of said outer peripheral slot forming unit; and the shortest linear distance "d" between said protruded surface and said guide ring being greater than a clearance distance "c" of said clearance sector formed by said outer peripheral end surface of said slot forming unit and said abutment surface of said guide ring so that the thickness of a skin layer of a resultant honeycomb structure will be substantially the same as said clearance distance "c".

2. A die for molding a honeycomb structure according to claim 1, wherein said guide ring is slidably arranged in parallel to an axial direction with respect to said metal die.

3. A die for molding a honeycomb structure according to claim 1, wherein a spacer for adjusting the clearance distance is arranged between said outer portion of said guide ring and said metal die.

4. A die for molding a honeycomb structure according to claim 1, wherein a relationship between a height "a" of said protruded surface and a height "b" of said outer peripheral slot forming unit is: $a \leq 0.5\, b$.

5. A die for molding a honeycomb structure according to claim 1, wherein a relationship between said clearance distance "c" and a height "a" of said protruded surface is: $c \leq a$.

6. A die for molding a honeycomb structure according to claim 1, wherein a relationship between said clearance distance "c" and said shortest linear distance "d" is: $c < d < 3\, c$.

7. A die for molding a honeycomb structure, comprising:

a metal die having a feed hole unit including feed holes for feeding a molding material, and a slot forming unit having slots communicating with said feed holes and through which the honeycomb structure is extruded and molded;

said slot forming unit having an outer peripheral slot forming unit and a main body slot forming unit positioned inward of said outer peripheral slot forming unit, and a protruded surface protruding in an extruding direction of the molding material and being formed between a main body end surface of said main body slot forming unit and an outer peripheral end surface of said outer peripheral slot forming unit;

a guide ring having an abutment surface spaced from said outer peripheral end surface and defining a clearance sector therebetween, said guide ring having an outer portion being fixed on said metal die and an inner portion spaced from said metal die; and the shortest linear distance "d" between said protruded surface and said guide ring being greater than a clearance distance "c" of said clearance sector defined by said outer peripheral end surface of said slot forming unit and said abutment surface of said guide ring so that the thickness of a skin layer of a resultant honeycomb structure will be substantially the same as said clearance distance "c", wherein said abutment surface and said outer peripheral end surface are oriented in generally parallel relation to each other.

* * * * *